Nov. 8, 1932.                J. E. LEE                 1,886,560
WEEDING TOOL
Filed June 19, 1931
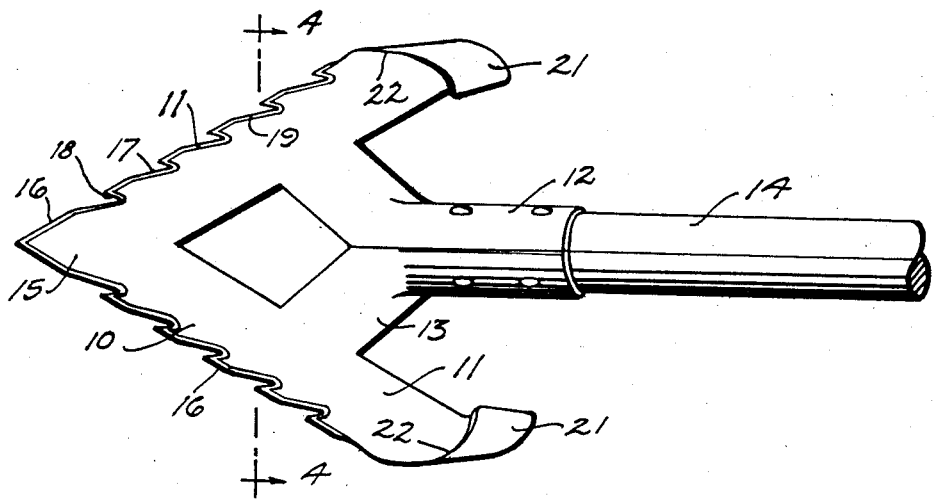
Fig. 1
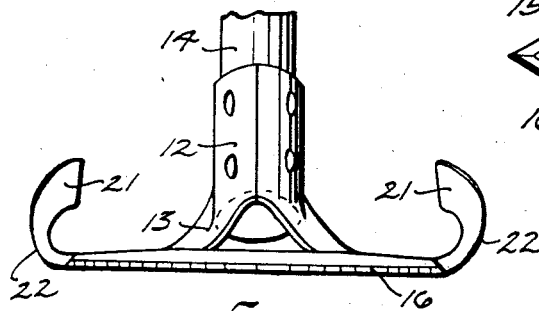
Fig. 2
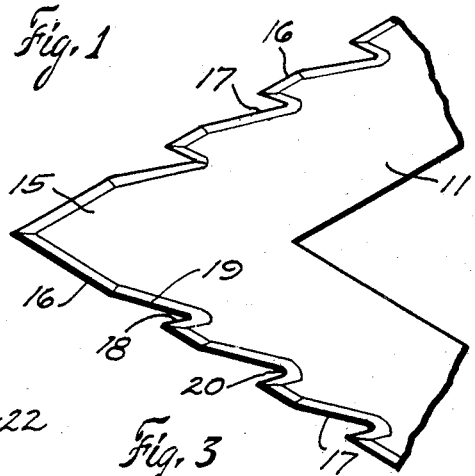
Fig. 3
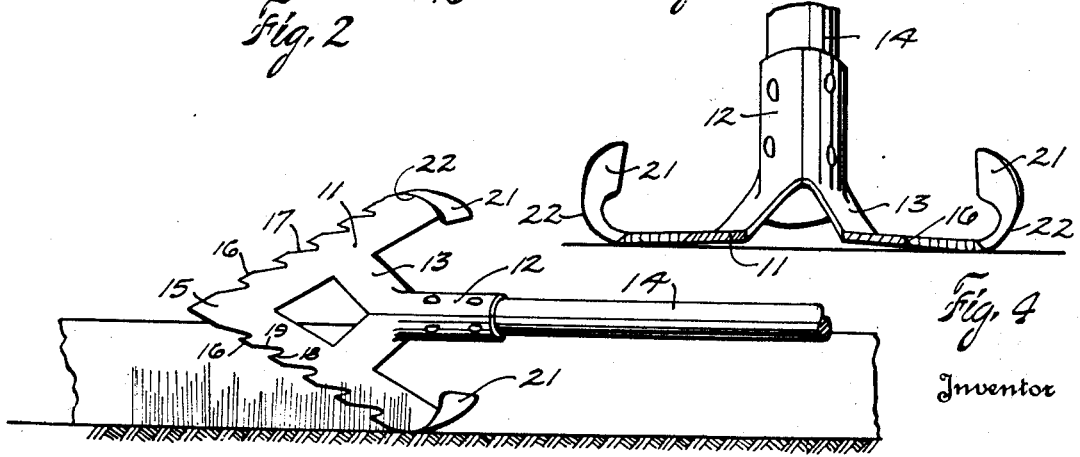
Fig. 4
Fig. 5
Inventor
John E. Lee
By Jack A Schley
Attorney Patented Nov. 8, 1932

1,886,560

UNITED STATES PATENT OFFICE

JOHN E. LEE, OF DALLAS, TEXAS, ASSIGNOR, BY DIRECT AND MESNE ASSIGNMENTS, TO WONDER HOE COMPANY, OF FORT WORTH, TEXAS, A CORPORATION OF TEXAS

WEEDING TOOL

Application filed June 19, 1931. Serial No. 545,460.

This invention relates to new and useful improvements in weeding tools, and more particularly to weeding tools of the horizontally acting hoe type.

One object of the invention is to provide an improved hand tool for efficiently and quickly cutting weeds and grass with a minimum amount of labor and without undue fatigue.

A further object of the invention is to provide a tool having improved cutting teeth constructed to produce a maximum cutting action and also which are less likely to catch or hang, particularly when slid along the sides of wooden railway ties and the like.

Another object of the invention is to provide curved overhanging cutters and cultivators at the rear ends of the tool, which may be used as cutters to cut along the base of an upright surface or which may be used to cut weeds and grass and at the same time turn the dirt away from or onto a planted row, according to the way the tool is turned.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a plan view of a tool constructed in accordance with the invention,

Figure 2 is a front elevation of the same,

Figure 3 is an enlarged detail of the front of the tool,

Figure 4 is a transverse sectional view taken on the line 4—4 of Figure 1, and

Figure 5 is an elevation of the tool turned into position for using one of its curved cutters.

In the drawing the numeral 10 designates a triangular body or sweep having divergent cutter blades 11 along each side. An upwardly inclined socket 12 is connected to the inner edges of the blades intermediate their ends by arms 13. The blades, arms and socket may be made from a single metal plate.

A suitable handle 14 has its lower end fastened in the socket 12.

The blades are merged at their forward ends into a triangular cutting point 15 having cutting edges 16 which are continued rearwardly along the outer edge of each blade preferably at about the same angle as at the point. Substantially V-shaped notches 17 are formed in the cutting edges of the blades. Each notch has a short side 18 and a long side 19 (Figure 3), the side 18 being preferably not more than one-half the length of the side 19. The long side of each notch is directed forwardly and the short side is directed outwardly.

It will be seen that the long side 19 of each notch has a tendency to guide the stems, stalks and the like into the notch, while the short side engages the stem or stalk. Both sides being cutting edges and converging will sever the stalk, stem, blade of grass, or other growth received in the notch.

The notches 17 being spaced apart not only provide a point 20 at the rear side of each notch, but also permit the cutting edge 16 between the notches to act upon work not received in the notches. The entire outer edge of each blade including the sides of the notches, forms a continuous cutting edge 16 and when the sweep is pushed forwardly a maximum cutting is had—the entire edge being active.

The blades are slightly inclined upwardly from their edges 16 to their inner edges and this causes the blades to cut at a slight angle to the horizontal as well as inducing the entire cutting edge to be flat on the ground. Further, as the under side of each blade wears, said blade will become more or less self-sharpening.

At the rear end of each blade a cultivator horn or shovel 21 is provided. Each shovel is curved upwardly and inwardly so as to overhang the blade and has its forward edge 22 sharpened to form a cutting edge. These shovels have been found very useful and important.

In ordinary use the shovels have no particular function, but when the sweep is turned on edge as is shown in Figure 5, the lower shovel 21 becomes a cutter for cutting growths out of corners and along the bases of railway ties and upright walls. In this position the edge 16 of the lower blade also cleans the side of the tie or wall.

A very important use of the shovels is in gardening. By turning the sweep on edge the lower shovel becomes a plow or cultivator. If the shovel is turned away from a row it will cut the weeds, grass, etc., and turn the same together away from the row. However, if the shovel is turned toward the row it will cut the growth and turn the soil toward the row when pushed along the same. It will be noted that each shovel is curved at such an angle as to give it an upward inclination from front to rear when used.

Various changes in the size and shape of the different parts, as well as modifications and alterations, may be made within the scope of the appended claims.

Having illustrated and described a preferred form of the invention, what I claim is:

1. In a tool of the class described, a horizontally acting hoe having blades diverging at an angle substantially less than ninety degrees provided with cutting edges and spaced notches in said edges, each notch of the blades having a long side and a short side and ample portions of the cutting edges being provided between the notches, and a handle attached to the hoe.

2. A tool as set forth in claim 1 and curved shovels at the rear ends of the blades having cutting edges.

3. In a tool of the class described, a horizontally acting hoe having notched cutting edges, and inwardly curved shovels at the rear of the hoe having cutting edges and disposed so as to incline when said cutting edges are presented to the work.

4. In a tool of the class described, a horizontally acting hoe having divergent blades provided with cutting edges and spaced notches in said edges, said notches having cutting edges, a handle attached to the hoe, and upwardly curved shovels one at the rear end of each blade having cutting edges.

5. In a hand weeding tool, a horizontally acting hoe having a forward point and blades provided with cutting edges diverging from said point at an acute angle to each other, the cutting edges extending longitudinally along the outer edge of each blade at about the same angle as at the point and having notches therein provided with cutting edges, whereby the cutting edges will slice weeds and stems with slight resistance to the forward movement of the hoe and also whereby the notches will catch and sever stems and weeds, and a handle extending from the hoe at an angle thereto, whereby the hoe may be placed flat on the ground when the handle is grasped by the user.

6. In a hand weeding tool, a horizontally acting hoe having a forward point and blades provided with cutting edges diverging from said point at an acute angle to each other, the cutting edges extending longitudinally along the outer edge of each blade and having notches therein provided with long and short cutting edges, whereby the cutting edges will slice weeds and stems with slight resistance to the forward movement of the hoe and also whereby the notches will catch and sever stems and weeds, the short cutting edges of the notches being not more than one-half the length of the long cutting edges, and a handle extending from the hoe at an angle thereto, whereby the hoe may be placed flat on the ground when the handle is grasped by the user.

In testimony whereof I affix my signature.

JOHN E. LEE.